(12) United States Patent
Haas

(10) Patent No.: US 11,591,000 B2
(45) Date of Patent: Feb. 28, 2023

(54) STEERING APPARATUS ASSEMBLY FOR A MOTOR VEHICLE

(71) Applicant: ZF Automotive Safety Germany GmbH, Aschaffenburg (DE)

(72) Inventor: Markus Haas, Oberzent (DE)

(73) Assignee: ZF Automotive Safety Germany GmbH, Aschaffenburg (DE)

( * ) Notice: Subject to any disclaimer, the term of this patent is extended or adjusted under 35 U.S.C. 154(b) by 0 days.

(21) Appl. No.: 17/297,295

(22) PCT Filed: Nov. 25, 2019

(86) PCT No.: PCT/EP2019/082418
§ 371 (c)(1),
(2) Date: May 26, 2021

(87) PCT Pub. No.: WO2020/126327
PCT Pub. Date: Jun. 25, 2020

(65) Prior Publication Data
US 2022/0024511 A1 Jan. 27, 2022

(30) Foreign Application Priority Data
Dec. 18, 2018 (DE) .......................... 202018107231.5

(51) Int. Cl.
*B62D 1/10* (2006.01)
(52) U.S. Cl.
CPC ...................... *B62D 1/10* (2013.01)
(58) Field of Classification Search
CPC ..... B62D 1/10; B62R 21/2037; B60R 21/203; B60R 21/2035; B60Q 5/003
(Continued)

(56) References Cited

U.S. PATENT DOCUMENTS 5,080,394 A * 1/1992 Mori ....................... B60R 21/33
280/734
5,092,628 A * 3/1992 Tamura ................... B60R 21/33
73/514.01
(Continued)

FOREIGN PATENT DOCUMENTS

DE 29621295 U1 3/1997
DE 102005056837 A1 4/2007

OTHER PUBLICATIONS

International Search Report and Written Opinion for PCT/EP2019/082418 dated Feb. 4, 2020 (10 pages; with English translation).

*Primary Examiner* — Paul N Dickson
*Assistant Examiner* — Caitlin Anne Miller
(74) *Attorney, Agent, or Firm* — Kristin L. Murphy

(57) ABSTRACT

A steering apparatus assembly, having a steering axis, about which the steering apparatus assembly can rotate in is disclosed. The steering apparatus assembly comprises a first element and a second element. The two elements are connected to one another by a first and second joints. The first joint comprises a resilient locking element, which is deflectable in a direction transverse to the steering axis to disengage the first joint. The second joint is deflectable by an axial load acting on the assembly elements away from one another. A wedge is provided having a wedge length transverse to the steering axis and a variable wedge height in the direction of the steering axis. The wedge length and length and a wedge inclination angle are matched to one another such that both the first joint and the second joint can be undone by a linear movement of the wedge in the longitudinal direction.

20 Claims, 4 Drawing Sheets

(58) Field of Classification Search
USPC .......................................................... 280/775
See application file for complete search history.

(56) References Cited

U.S. PATENT DOCUMENTS

| | | | | |
|---|---|---|---|---|
| 5,165,717 | A * | 11/1992 | Tanaka | ..................... B60R 21/33 |
| | | | | 200/61.45 R |
| 6,554,312 | B2 * | 4/2003 | Sakane | ............... B60R 21/2037 |
| | | | | 280/728.2 |
| 7,789,415 | B2 * | 9/2010 | Groleau | ............. B60R 21/2037 |
| | | | | 280/728.2 |
| 2005/0161308 | A1 * | 7/2005 | Frisch | ................. B60R 21/2037 |
| | | | | 200/61.54 |
| 2009/0309337 | A1 | 12/2009 | Groleau et al. | |
| 2009/0315304 | A1 | 12/2009 | Hagelgans et al. | |
| 2012/0080868 | A1 | 4/2012 | Banno et al. | |
| 2022/0001824 | A1 * | 1/2022 | Haas | ..................... B60R 21/203 |

* cited by examiner

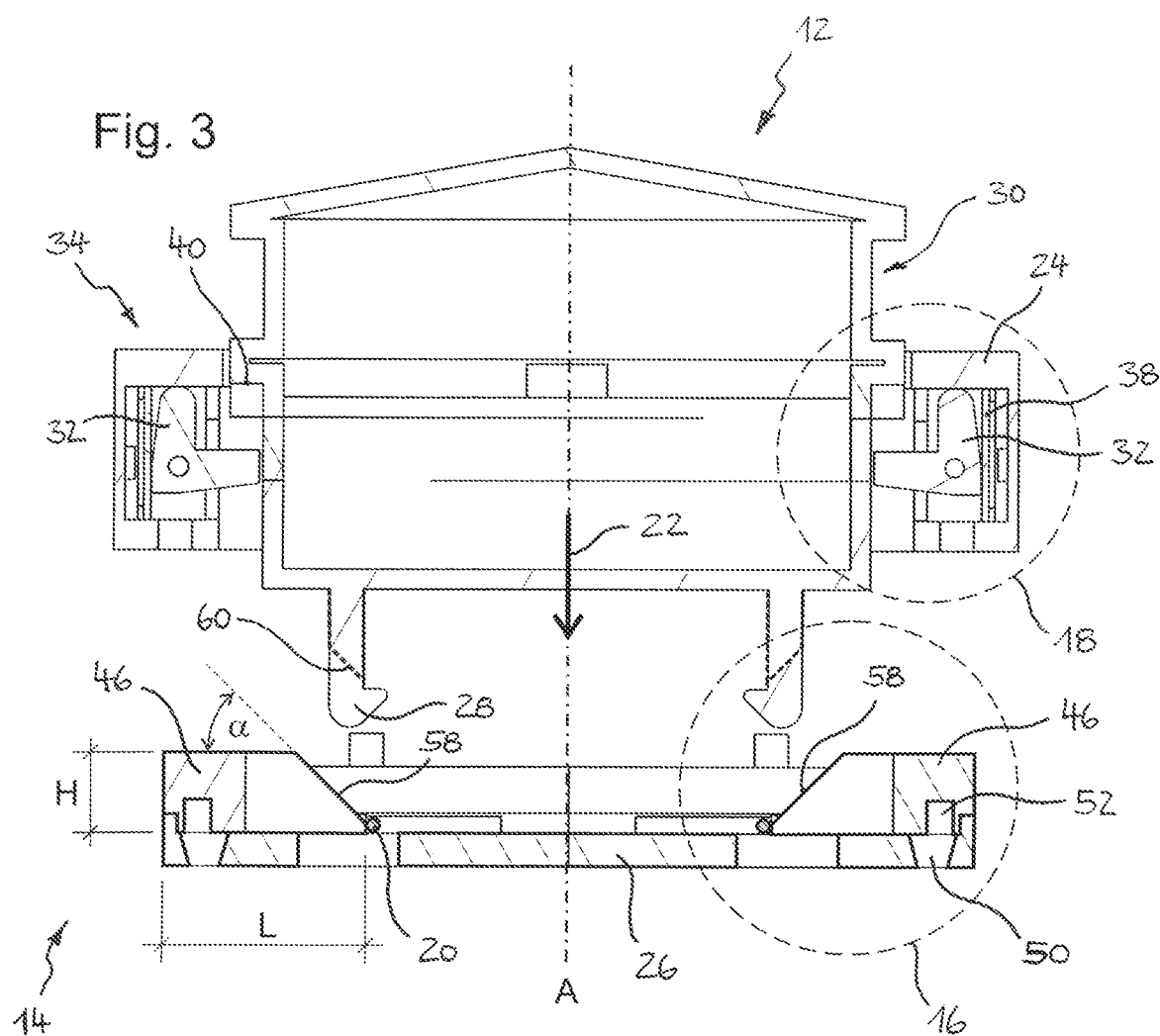
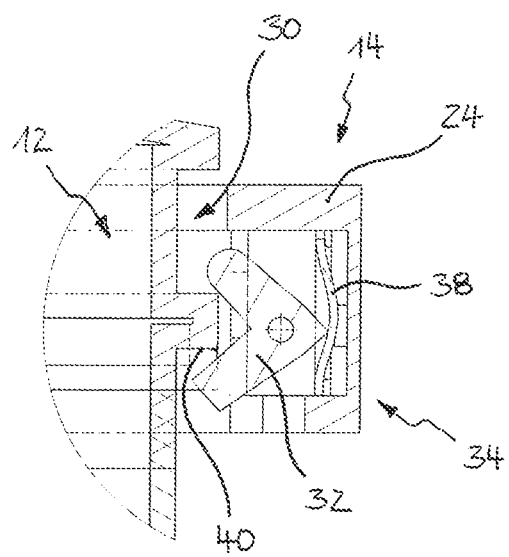

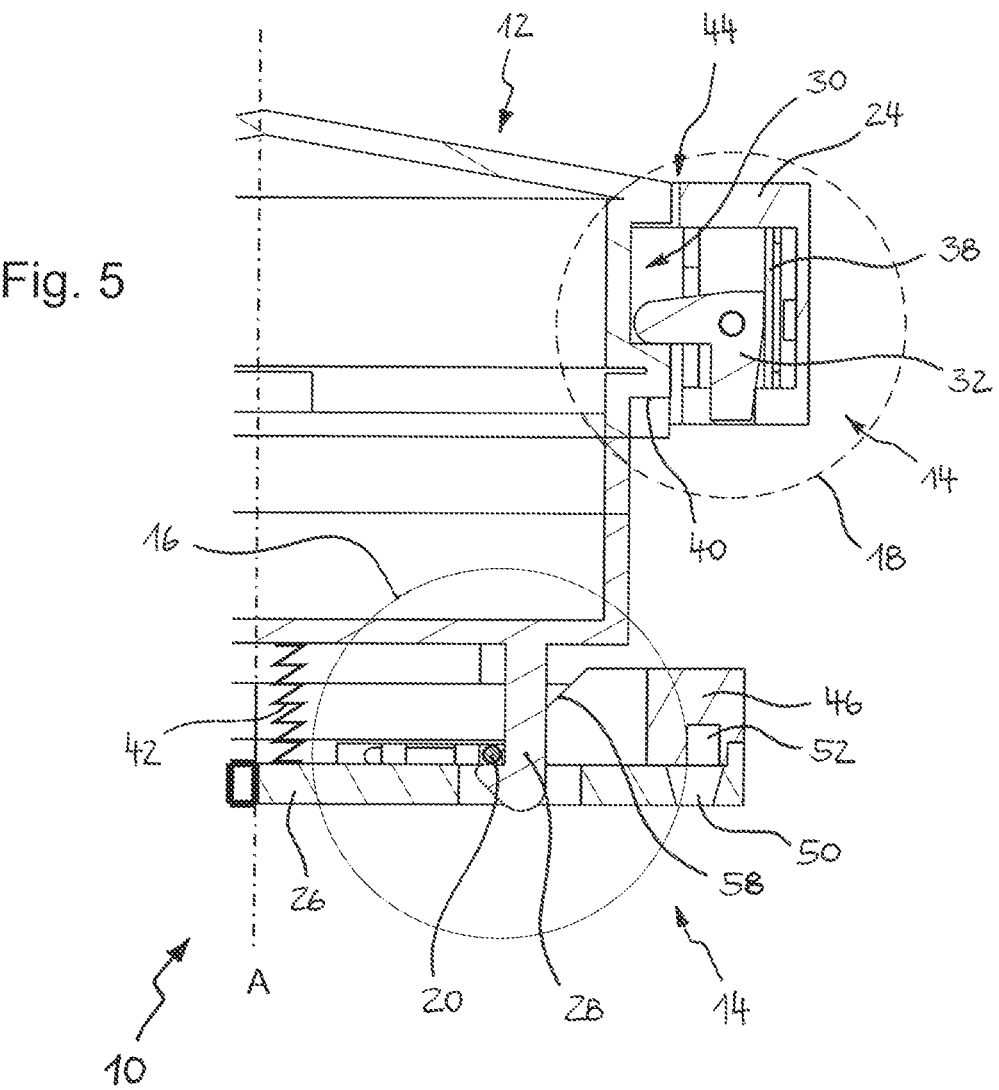

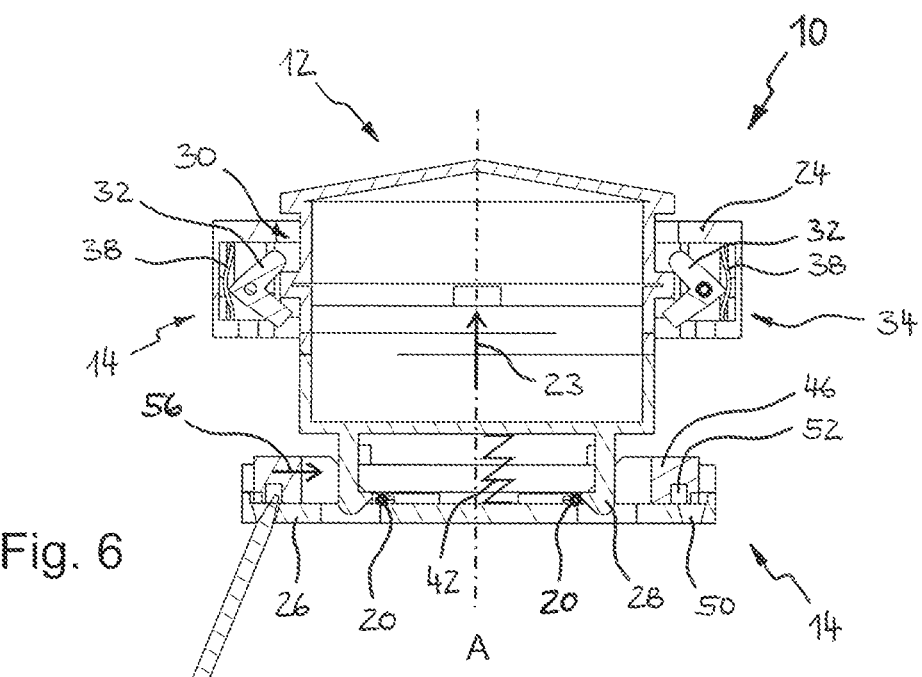
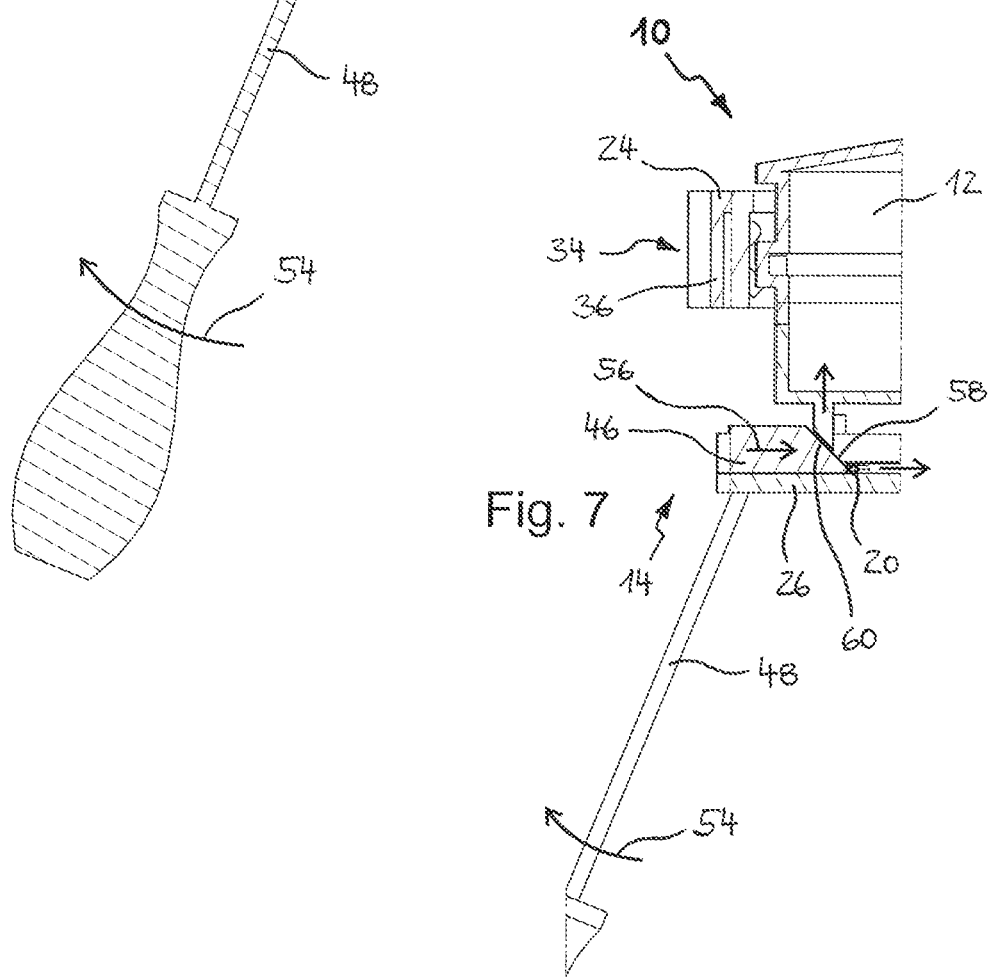

STEERING APPARATUS ASSEMBLY FOR A MOTOR VEHICLE

CROSS-REFERENCE TO RELATED APPLICATIONS

This application is a national stage of International Application No. PCT/EP2019/082418, filed Nov. 25, 2019, the disclosure of which is incorporated herein by reference in its entirety, and which claims priority to German Patent Application No. 202018107231.5, filed Dec. 18, 2018, the disclosure of which is incorporated herein by reference in its entirety.

TECHNICAL FIELD

The disclosure relates to a steering apparatus assembly for a motor vehicle, having a steering axis about which the steering apparatus assembly can rotate in the installed condition, a first assembly element and a second assembly element, wherein the two assembly elements are connected to each other by a first joint, for example by a first locking joint, and a second joint, for example by a second locking joint, wherein the first joint comprises a resilient locking element that can be deflected in a direction transverse to the steering axis to undo the first joint, and wherein the second joint can be undone by an axial load acting on the assembly elements away from each other.

BACKGROUND

Conventional steering apparatus assemblies of motor vehicles usually comprise a rotatable steering apparatus, and more specifically, a steering wheel, as well as an airbag module fastened in a hub region of the steering apparatus. The airbag module may include airbag module rigid catch hooks for locking with the steering apparatus. The airbag module is mounted, for example, by means of two locking mechanisms which fulfil different tasks. More specifically, the rigid catch hooks lock with a resilient locking element pre-mounted on the steering apparatus (first locking mechanism) and, moreover, engage in foam pockets of the steering apparatus with which they equally lock (second locking mechanism). The first locking mechanism prevents against the airbag module detaching from the steering apparatus even with high axial forces, and thus to remain reliably connected to the steering apparatus. During normal driving operation, i.e., prior to activation of the airbag module, the resilient locking element, for example in the form of a spring wire, may be spaced apart from the rigid catch hooks. The fine positioning of the airbag module during normal driving operation is guaranteed by the second locking mechanism.

During disassembly of the airbag module, the two locking joints must be disengaged so that the airbag module can be removed from the steering apparatus. For this purpose, in conventional steering apparatus assemblies, usually specific tools are required. Moreover, the disassembly is quite difficult and requires expenditure of time and energy for an assembler.

What is needed is a steering apparatus assembly in which a first assembly element in the form of an airbag module, for example, can be mounted in a quick, accurately fitting and robust manner on a second assembly element in the form of a steering apparatus, for example, but can also be quickly disassembled again from the second assembly element with little effort.

SUMMARY

A steering apparatus assembly is disclosed in which a wedge is provided that has a wedge length transverse to a steering axis and a variable wedge height in the direction of the steering axis. The wedge length, the wedge height and an angle of inclination of the wedge are matched to one another such that both a first joint and a second joint of assembly elements can be undone by a linear movement of the wedge in a longitudinal direction of the wedge.

According to one exemplary arrangement of the steering apparatus assembly, a first assembly element includes a substantially rigid catch hook for locking with a resilient locking element.

In one exemplary arrangement, the resilient locking element is mounted on a second assembly element so that the catch hook and the resilient locking element can form the first (locking) joint.

According to another exemplary arrangement of the steering apparatus assembly, the first assembly element comprises a locking recess and the second assembly element comprises a spring-loaded locking body for locking with the locking recess. Consequently, the spring-loaded locking body and the locking recess can form the second (locking) joint.

Alternatively, it is also contemplated that for forming the second locking joint, the second assembly element comprises foam pockets and the first assembly element comprises associated rigid foam hooks which can lock with said foam pockets.

In one exemplary arrangement, the wedge is fastened on the second assembly element to be restrictedly movable in the longitudinal direction of the wedge and is movable between a locking position in which the two assembly elements are connected to each other in the axial direction and a disassembly position in which the two assembly elements are unconnected in the axial direction. Optionally, a wedge spring element may be provided which loads the wedge into the locking position.

In one exemplary arrangement, with respect to the steering axis, the longitudinal wedge direction of the wedge may correspond to a radial direction of the steering apparatus assembly.

According to another exemplary arrangement of the steering apparatus assembly, the first assembly element is an airbag module and the second assembly element is a steering apparatus, an in one exemplary arrangement, a vehicle steering wheel. Alternatively, it is also contemplated that the first assembly element corresponds to the steering apparatus and the second assembly element corresponds to the airbag module.

The steering apparatus in this arrangement includes an anchoring component having integrally formed extensions for restrictedly movable support of the resilient locking element and/or the wedge. Locking bodies and wedge elements thus can be quickly and easily pre-mounted on the second assembly element with little manufacturing expenditure. The anchoring component may be, for example, a steering skeleton or an intermediate plate of the steering apparatus firmly connected to the skeleton.

BRIEF DESCRIPTION OF THE DRAWINGS

Further features and advantages of the disclosure will be evident from the following description of an exemplary arrangement with reference to the drawings, wherein:

FIG. 3 shows a cross-sectional view across the steering apparatus assembly according to FIG. 2 prior to being assembled;

FIG. 4 shows a section detail of the steering apparatus assembly according to FIG. 2 in a region of a second locking joint while being assembled;

FIG. 5 shows a cross-sectional view across the steering apparatus assembly according to FIG. 2 after being assembled;

FIG. 6 shows a section across the steering apparatus assembly according to FIG. 2 when a first assembly element is disassembled; and FIG. 7 shows another cross-sectional view across the steering apparatus assembly according to FIG. 2 when the first assembly element is disassembled.

DETAILED DESCRIPTION

Figure 1:
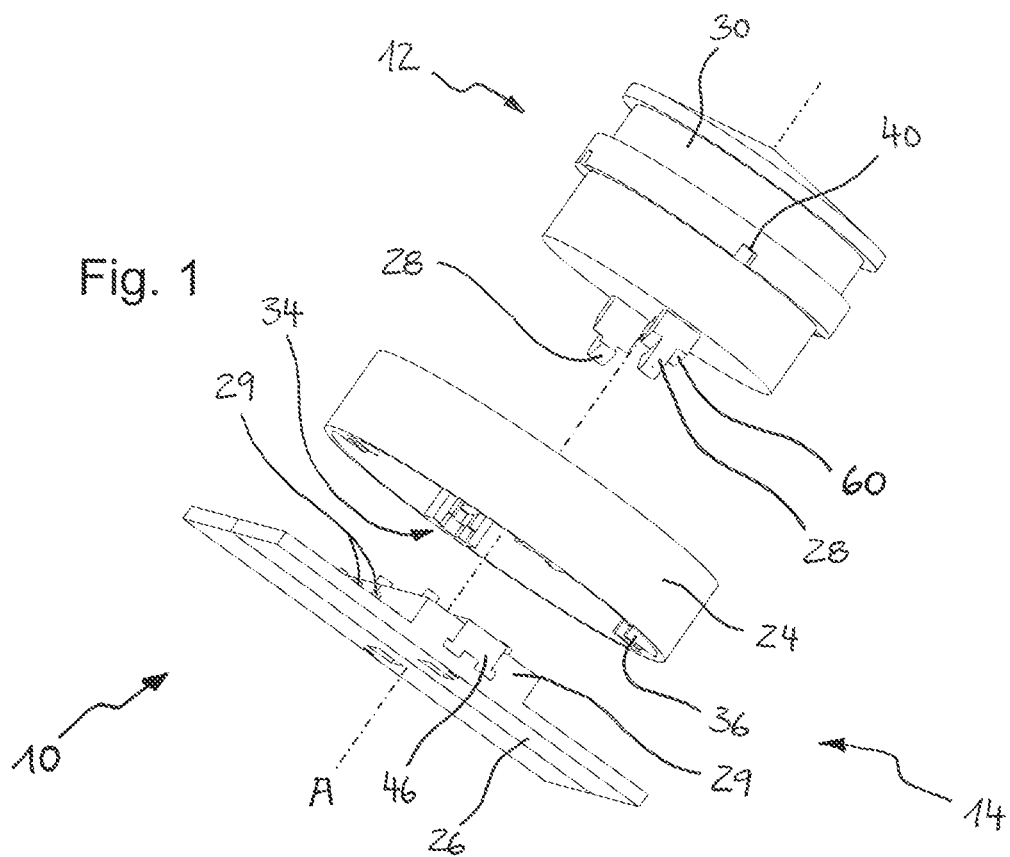
FIG. 1 shows a perspective exploded view of a steering apparatus assembly according to an exemplary arrangement of the disclosure.

FIGS. 1 to 7 illustrate a steering apparatus assembly 10 for a motor vehicle comprising a steering axis A about which the steering apparatus assembly 10 can be rotated in its installed condition, a first assembly element 12 and a second assembly element 14. The two assembly elements 12, 14 are connected to each other, as shown in FIG. 5, by a first joint 16, and in one exemplary arrangement, a first locking joint, and a second joint 18, and in one exemplary arrangement, a second locking joint. The first joint 16 comprises a resilient locking element 20 which can be deflected in a direction transverse to the steering axis A to undo the first joint 16. The resilient locking element 20 is pre-mounted on the second assembly element 14 and in one exemplary arrangement, may be configured as a spring wire. The second joint 18 can be undone by an axial load acting on the assembly elements 12, 14 away from each other.

In the shown arrangement of the steering apparatus assembly 10, the first assembly element 12 is an airbag module and the second assembly element 14 is a steering apparatus. The steering apparatus may specifically be a steering wheel, wherein in the Figures merely cutouts of the steering wheel in the hub region are schematically indicated.

As an alternative, it is also contemplated that the first assembly element 12 may correspond to the steering apparatus and the second assembly element 14 correspond to the airbag module.

The airbag module has a longitudinal module axis and, when being mounted, is moved in an axial assembly direction 22 until it locks with the steering apparatus (see FIGS. 3 to 5). A disassembly of the airbag module is carried out in an opposite axial disassembly direction 23 (see FIGS. 6 and 7). In the present exemplary arrangement, the longitudinal module axis extends in parallel to the steering axis A of the steering apparatus and can be identical to the same.

The second assembly element 14 which in the disclosed exemplary arrangement is configured as steering apparatus, comprises a hider 24 which, in the assembled condition of the steering apparatus assembly 10, is at least partially visible and abuts on the first assembly element 12 which in the disclosed exemplary arrangement is configured as an airbag module. Further, the second assembly element 14 comprises a skeleton, in particular a steering wheel skeleton generally known from prior art comprising a rim portion, a spoke portion and a hub portion. An anchoring component 26 for the airbag module schematically indicated in the Figures is a skeleton portion, in particular a hub portion of a steering wheel skeleton or an intermediate plate of the steering apparatus permanently connected to the skeleton. Although indicated in a graphically simplified form in the schematic Figures as separate units, the hider 24 and the anchoring component 26 are components of the second assembly element 14 which are permanently connected to each other.

On the anchoring component 26 of the second assembly element 14, the resilient locking element 20 in the form of a locking spring is pre-mounted and forms the first joint 16, after assembling the airbag module on the steering apparatus with a substantially rigid catch hook 28 of the first assembly element 12. More specifically, extensions 29 integrally formed on the anchoring component 26 are provided for supporting the resilient locking element 20 in a manner to be restrictedly movable.

Further, the first assembly element 12 includes a locking recess 30 and the second assembly element 14 includes a spring-loaded locking body 32 for locking with the locking recess 30 to form the second joint 18.

In the present exemplary arrangement, the locking body 32 is configured as a locking lever and is part of a locking lever unit 34 that further comprises a carrier 36 on which the locking lever is mounted for pivoting between an initial position and a final assembly position, as well as a spring element 38 for loading the locking lever into the initial or final assembly position.

In one exemplary arrangement, the carrier 36 is permanently connected to the second assembly element 14, and may be fixedly connected to the hider 24 of the second assembly element 14. In one exemplary arrangement, the carrier 36 is integrally integrated in the hider 24.

Figure 2:
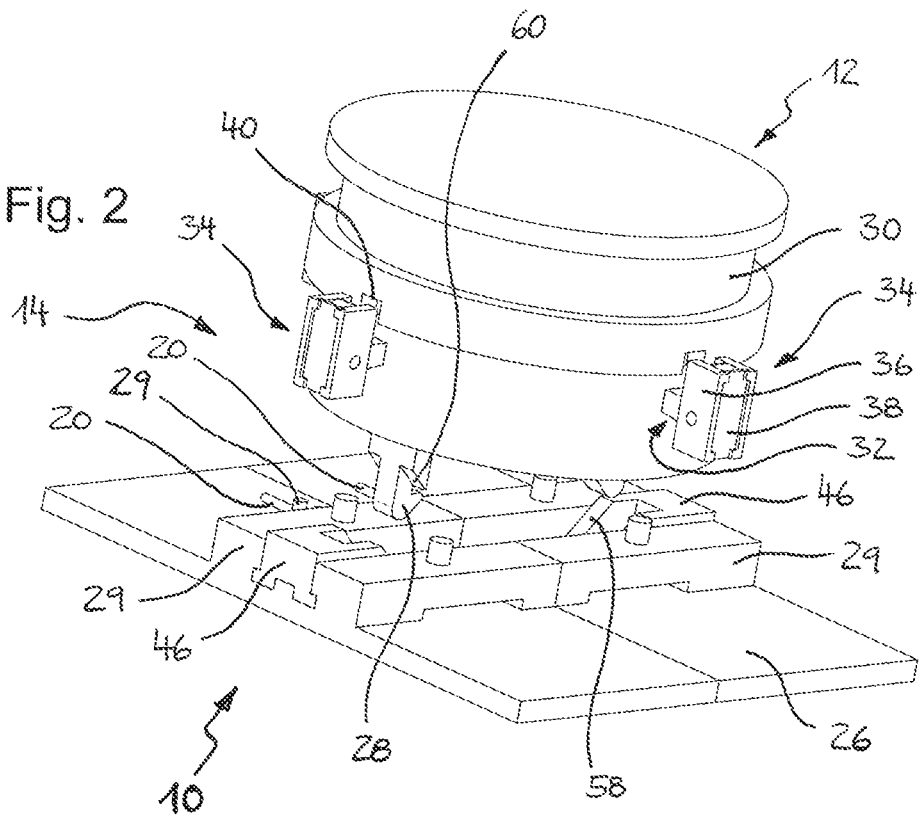
FIG. 2 shows a perspective view of the steering apparatus assembly according to FIG. 1 prior to being assembled.

The second assembly element 14 preferably has a plurality of locking lever units 34 for forming the second locking joint. In one exemplary arrangement, the locking lever units 34 are positioned on the inside of the annularly configured hider 24, for example with four locking lever units 34 being evenly distributed in a peripheral direction, as is indicated in FIGS. 1 and 2.

FIGS. 3 to 5 illustrate longitudinal sections of the steering apparatus assembly 10, with FIG. 3 showing a condition prior to assembly, FIG. 4 showing a condition during assembly and FIG. 5 showing a condition after assembly of the first assembly element 12 on the second assembly element 14. Hence, according to FIG. 3 each locking body 32 is in its initial position. In FIG. 4, each locking body 32 is in an intermediate position. In FIG. 5, each locking body 32 is in its final assembly position.

According to FIGS. 3 to 5, the spring element 38 of the locking lever unit 34 is a leaf spring attached to the carrier 36. In the initial position of the locking lever according to FIG. 3 and in the final assembly position of the locking lever according to FIG. 5, said spring element 38 is largely relaxed or has only a certain residual tension. When pivoting the locking lever between its initial position and its final assembly position, the spring element 38 is deformed and thus tensioned by a locking lever projection. In the present case, the spring element 34 reaches its maximum deformation approximately in the middle between the initial position and the final assembly position, i.e., the intermediate position, of the pivotable locking lever, as illustrated in FIG. 4.

Accordingly, the spring element 38 loads the locking body 32 in response to the current pivoting position thereof into the initial position or final assembly position, whichever is closer.

The first assembly element 12 configured as an airbag module comprises an axial stop 40 for pivoting the locking body 32 from the initial position into the final assembly position. In this final assembly position, the locking body 32 then engages in the locking recess 30 of the first assembly element 12 which, according to FIG. 1, may be a peripheral groove extending in the peripheral direction.

As already afore-mentioned, one of the two assembly elements 12, 14, in exemplary arrangement shown, the first assembly element 12 configured as an airbag module, includes the substantially rigid catch hook 28, and the other of the two assembly elements 12, 14, in the exemplary arrangement shown, the second assembly body 14 configured as a steering apparatus, includes the resilient locking element 20 for locking with the catch hook 28.

By way of FIGS. 3 to 5, the assembly of the airbag module on the steering apparatus of a motor vehicle by means of the afore-described steering apparatus assembly 10 will be described below.

According to the exemplary arrangement depicted in FIG. 3, initially the first assembly element 12 is directed to the second assembly element 14 in the axial assembly direction 22, with the locking body 32 being in its initial position. In so doing, the first assembly element 12 can be guided via a guide groove and the locking body 32 engaging in the latter in the axial direction on the second assembly element 14.

In said axial relative movement of the two assembly elements 12, 14, the locking body 32 in the form of a locking lever comes into contact with the stop 40 of the first assembly element 12, thus causing the locking lever to be pivoted and the spring element 38 to be tensioned, as shown in FIG. 4. After overcoming a maximum deformation of the spring element 38 in an intermediate position of the locking lever, the first assembly element 12 is moved further in the assembly direction, until the locking lever, being assisted by the spring force of the spring element 38, snaps into the locking recess 30 of the first assembly element 12 and thus adopts its final assembly position.

However, before the locking lever reaches its final assembly position, the resilient locking element 20 already locks with the catch hook 28.

Thus, the fine positioning of the airbag module relative to the steering apparatus is carried out during normal driving operation, that is, before activation of the airbag module, by the locking joint between the locking body 32 and the locking recess 30, while the resilient locking element 20 is preferably slightly spaced apart from the catch hook 28 in the axial direction.

The first locking joint between the resilient locking element 20 and the catch hook 28 is mechanically loaded only after the airbag module has been activated and then ensures that the airbag module does not detach from the steering apparatus, even if high forces occur, but remains reliably connected to the steering apparatus.

During a normal driving operation, the axial and radial positioning between the airbag module, for example, a module housing of the airbag module, and the steering apparatus, such as the hider 24 of the steering apparatus, is thus exclusively performed via the locking body 32.

According to the exemplary arrangement shown in FIG. 5, a spring 42 is provided, such as a module ejection or horn spring, which loads a lower edge of the locking recess 30 axially against the locking body 32 retained by the spring element 38 in the final assembly position and thus ensures precise axial alignment of the airbag module.

The radial alignment of the airbag module is performed via the locking bodies 32 arranged to be distributed in the peripheral direction and is substantially only dependent on the geometry thereof, especially the radial dimensions thereof.

Due to these short tolerance chains, an especially exact axial and radial fine positioning of the airbag module relative to the steering apparatus is possible with comparatively little effort. In this way, also high requirements made to gap width can be met which provide gap widths of significantly less than 1 mm, and in one exemplary arrangement, of about 0.5 mm, for example for a gap 44 between a module cover of the airbag module and the hider 24 of the steering apparatus.

Instead of a locking between the locking bodies 32 and at least one associated locking recess 30, the second joint 18 can also be realized in an alternative manner. For example, in one exemplary configuration, it is contemplated, for the first assembly element 12 to include rigid locking hooks and for the second assembly element 14 to include a foam wrapping with foam pockets, wherein, when mounting the first assembly element 12 on the second assembly element 14, each locking hook locks in an associated foam pocket to form a respective second joint 18.

Based on a completely assembled steering apparatus assembly 10, in the following disassembly of the first assembly element 12 from the second assembly element 14 will be described in more detail.

As already afore-mentioned, the two assembly elements 12, 14 are connected to each other by the first joint 16 and the second joint 18, wherein the first joint 16 includes the resilient locking element 20 which can be deflected in a direction transverse to the steering axis A to undo the first joint 16, and wherein the second joint 18 can be undone by an axial load acting on the assembly elements 12, 14 away from each other.

According to FIG. 3, the steering apparatus assembly 10 comprises a wedge 46 which has a wedge length L transverse to the steering axis A and a variable wedge height H in the direction of the steering axis A, the wedge length L, the wedge height H and an angle of inclination a of the wedge 46 being matched to one another such that both the first joint 16 and the second joint 18 of the two assembly elements 12, 14 can be undone by a linear movement of the wedge 46 in the longitudinal direction of the wedge 46. With respect to the steering axis A, the longitudinal direction of the wedge 46 corresponds especially to a radial direction of the steering apparatus assembly 10.

In the shown exemplary arrangement, the steering apparatus assembly 10 comprises two wedges 46 that are pre-mounted on the second assembly element 14. In one exemplary arrangement, the anchoring component 26 of the second assembly element 14 (as shown in FIGS. 1 and 2) includes integrally formed extensions 29 for a restrictedly movable support of the wedges 46. The two wedges 46 are positioned to be facing each other and are movable toward each other or away from each other in the radial direction with respect to the steering axis A. As a matter of course, alternative configurations are also contemplated in which the steering apparatus assembly 10 has a different number of wedges 46, for example, only one wedge 46 or three wedges 46.

Each wedge 46 is attached to the second assembly element 14 so as to be restrictedly movable in the longitudinal direction of the wedge so as to be movable between a locking position according to FIG. 5 in which the two assembly elements 12, 14 are connected to each other in the axial direction and a disassembly position according to FIG. 6 in which the two assembly elements 12, 14 are unconnected in the axial direction.

FIGS. 6 and 7 illustrate the first joint 16 and the second joint 18 being undone when the airbag module is disassembled from the steering apparatus.

According to FIG. 6, a tool 48 is inserted through an opening 50 of the second assembly element 14 into a recess 52 of the wedge 46. Subsequently, the wedge 46 is displaced by a swivel movement 54 of the tool 48 in the longitudinal direction of the wedge from the locking position into the shown disassembly position (see arrow 56).

As is illustrated in FIG. 7, during such displacement in the longitudinal direction of the wedge, the wedge 46 acts on the resilient locking element 20 and, by deformation transverse to the steering axis A, disengages the resilient locking element 20 from the associated catch hook 28 of the first assembly element 12 so that the first locking joint is undone. Moreover, an inclined wedge surface 58 of the wedge 46 acts on a counter-surface 60 of the first assembly element 12 such that a load acts on the first assembly element 12 in the axial direction away from the second assembly element 14 by the movement of the wedge 46 and, consequently, the second locking joint 14 is undone. In this way, in FIG. 6 the spring element 38 was already tensioned again, and the locking body 32 was moved into an intermediate position. When the wedge 46 is moved slightly further in the longitudinal direction of the wedge, the steering apparatus assembly 10 adopts, being assisted by the spring forces of the spring element 38 and of the spring 42, a condition corresponding to the condition prior to the assembly (see FIG. 3).

In the present embodiment, the steering apparatus assembly 10 has two rigid catch hooks 28 with each of which a resilient locking element 20 is associated. Accordingly, the two resilient locking elements 20 can be disengaged from the catch hooks 28 during disassembly either one after the other or simultaneously by means of two tools 48.

The geometry of the wedge 46 is preferably adapted to the respective basic conditions of the steering apparatus assembly 10 to safeguard easy disassembly.

In particular, the wedge length L, the wedge height H and the angle of inclination a of the inclined wedge surface 58 is especially matched such that, when the wedge 46 is displaced in the longitudinal direction of the wedge, an axial force builds up between the inclined wedge surface 58 and the counter-surface 60 only when the resilient locking element 20 is already largely disengaged from the associated catch hook 28. In this way, the wedge 46 is reliably prevented from getting inadvertently jammed during disassembly.

The invention claimed is:

1. A steering apparatus assembly for a motor vehicle, having a steering axis about which the steering apparatus assembly can rotate in an installed condition, the steering apparatus assembly comprising, a first assembly element and a second assembly element, wherein the first and second assembly elements are connected to each other by a first joint, and a second joint, wherein the first joint comprises a resilient locking element which can be deflected in a direction transverse to the steering axis to disengage the first joint, wherein the first assembly element comprises a substantially rigid catch hook for locking with the resilient locking element and wherein the second joint can be disengaged by an axial load acting on the first and second assembly elements away from each other, wherein a wedge is provided which has a wedge length transverse to the steering axis and a variable wedge height in a direction of the steering axis, wherein the wedge length, the wedge height and an angle of inclination of the wedge are matched to one another such that both the first joint and the second joint of the first and second assembly elements can be undone by a linear movement of the wedge in a longitudinal direction of the wedge.

2. The steering apparatus assembly according to claim 1, wherein the resilient locking element is mounted on the second assembly element.

3. The steering apparatus assembly according to claim 1, wherein the first assembly element comprises a locking recess and the second assembly element comprises a spring-loaded locking body for locking with the locking recess.

4. The steering apparatus assembly according to claim 1, wherein the wedge is attached to the second assembly element to be restrictedly movable in the longitudinal direction of the wedge and can be moved between a locking position in which the first and second assembly elements are connected to each other and a disassembly position in which the first and second assembly elements are unconnected.

5. The steering apparatus assembly according to claim 1, wherein the longitudinal direction of the wedge substantially corresponds to a radial direction of the steering apparatus assembly.

6. The steering apparatus assembly according to claim 1, wherein the first assembly element is an airbag module and the second assembly element is a steering apparatus.

7. The steering apparatus assembly according to claim 6, wherein the steering apparatus includes an anchoring component having integrally formed extensions for restrictedly movable support of the resilient locking element and/or the wedge.

8. The steering apparatus assembly according to claim 7, wherein the extensions further include a keyway therein, the keyway receiving a mating key element disposed on a bottom surface of the wedge such that the wedge is only movable along one axis.

9. The steering apparatus assembly according to claim 1, wherein the wedge includes first and second sections, wherein the first section has a constant wedge height and the second section includes the variable wedge height.

10. The steering apparatus assembly according to claim 9, further comprising a recess extending inwardly from an edge of the second section of the wedge toward the first section.

11. The steering apparatus assembly according to claim 10, wherein the first assembly element comprises an extension member extending from a bottom surface of the first assembly element, wherein the extension member carries a substantially rigid catch hook and wherein a counter surface is disposed on the extension member on either side of the catch hook.

12. The steering apparatus assembly of claim 11, wherein the counter surfaces are inclined so as to mate with the variable wedge height of the second section of the wedge.

13. The steering apparatus assembly of claim 1, wherein the wedge further includes a recess disposed in a bottom surface of the wedge, the recess configured for receiving a tool to move the wedge in the longitudinal direction between a locking position and a disassembly position.

14. The steering apparatus assembly of claim 13, further including an anchoring component having extensions for restrictedly moveable support of the wedge, wherein the anchoring component further comprises an opening that is disposed in a bottom surface of the anchoring component, the opening being in communication with the recess when the wedge is in locking position.

15. A steering apparatus assembly for a motor vehicle, having a steering axis about which the steering apparatus assembly can rotate in an installed condition, the steering apparatus assembly comprising:

a first assembly element and a second assembly element, wherein the first and second assembly elements are connected to each other by a first joint and a second joint and wherein the first assembly element comprises a locking recess and the second assembly element comprises a spring-loaded locking body for locking with the locking recess, wherein the first joint comprises a resilient locking element which can be deflected in a direction transverse to the steering axis to disengage the first joint, and wherein the second joint can be disengaged by an axial load acting on the first and second assembly elements away from each other, wherein a wedge is provided which is attached to the second assembly element to be restrictedly movable in a longitudinal direction of the wedge; and wherein the wedge has a wedge length transverse to the steering axis and a variable wedge height in a direction of the steering axis, wherein the wedge length, the wedge height and an angle of inclination of the wedge are matched to one another such that both the first joint and the second joint of the first and second assembly elements can be undone by a linear movement of the wedge in a longitudinal direction of the wedge.

16. The steering apparatus assembly of claim 15, wherein the wedge includes first and second sections, wherein the first section has a constant wedge height and the second section includes the variable wedge height.

17. The steering apparatus assembly of claim 15, wherein the steering apparatus includes an anchoring component having integrally formed extensions for restrictedly movable support of the wedge.

18. The steering apparatus assembly according to claim 17, wherein the extensions further include a keyway therein, the keyway receiving a mating key element disposed on a bottom surface of the wedge such that the wedge is only movable along one axis.

19. The steering apparatus assembly according to claim 15, wherein the locking body is configured as a locking lever unit mounted for pivoting movement between an initial position and a final assembly position.

20. A steering apparatus assembly for a motor vehicle, having a steering axis about which the steering apparatus assembly can rotate in an installed condition, the steering apparatus assembly comprising, a first assembly element and a second assembly element, wherein the first and second assembly elements are connected to each other by a first joint, and a second joint, wherein the first joint comprises a resilient locking element which can be deflected in a direction transverse to the steering axis to disengage the first joint, wherein the first assembly element comprises a locking recess and the second assembly element comprises a spring-loaded locking body for locking with the locking recess and wherein the second joint can be disengaged by an axial load acting on the first and second assembly elements away from each other, wherein a wedge is provided which has a wedge length transverse to the steering axis and a variable wedge height in a direction of the steering axis, wherein the wedge length, the wedge height and an angle of inclination of the wedge are matched to one another such that both the first joint and the second joint of the first and second assembly elements can be undone by a linear movement of the wedge in a longitudinal direction of the wedge.

* * * * *